United States Patent [19]

Keggenhoff et al.

[11] 4,211,751
[45] Jul. 8, 1980

[54] USE OF AN APPARATUS FOR CONTINUOUS PHOTOPOLYMERIZATION

[75] Inventors: Berthold Keggenhoff; Eberhard Bandtel; Hans J. Rosenkranz, all of Krefeld, Fed. Rep. of Germany

[73] Assignee: Bayer Aktiengesellschaft, Leverkusen, Fed. Rep. of Germany

[21] Appl. No.: 880,826

[22] Filed: Feb. 23, 1978

[30] Foreign Application Priority Data

Mar. 5, 1977 [DE] Fed. Rep. of Germany ....... 2709606

[51] Int. Cl.$^2$ ............................ B01J 1/10; C08F 2/48
[52] U.S. Cl. ............................ 422/134; 204/159.22; 250/527; 422/135; 422/138; 422/186
[58] Field of Search ............... 422/186, 135, 138, 134, 422/131; 204/159.22; 250/527

[56] References Cited

U.S. PATENT DOCUMENTS

| | | | |
|---|---|---|---|
| 1,339,675 | 5/1920 | Snelling | 422/186 X |
| 1,523,563 | 1/1925 | Snelling | 422/186 X |
| 2,281,768 | 5/1942 | Heerema et al. | 204/159.22 |
| 2,762,769 | 9/1956 | Smith | 422/186 X |
| 2,941,934 | 6/1960 | Anspan et al. | 204/159.22 |
| 3,167,395 | 1/1965 | Spence et al. | 422/131 |
| 3,345,140 | 10/1967 | Saito et al. | 422/186 X |
| 3,600,349 | 8/1971 | Stone | 422/131 X |

*Primary Examiner*—Barry S. Richman
*Attorney, Agent, or Firm*—Sprung, Felfe, Horn, Lynch & Kramer

[57] ABSTRACT

For photopolymerization, glass cylinders through which a mechanically stirred stream of ethylinically unsaturated monomeric material continually flows are irradiated from the exterior with light which initiates polymerization.

5 Claims, 6 Drawing Figures

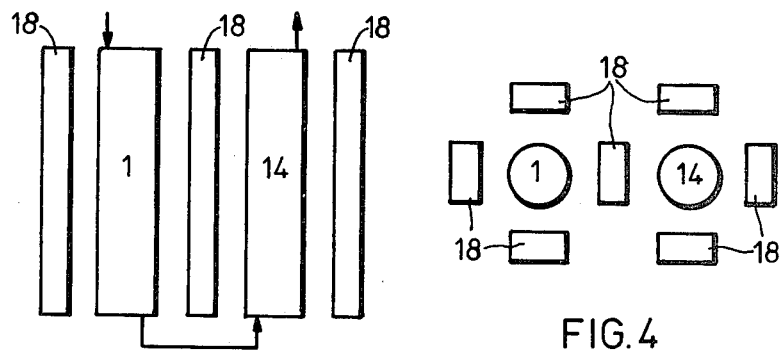
FIG. 3
FIG. 4
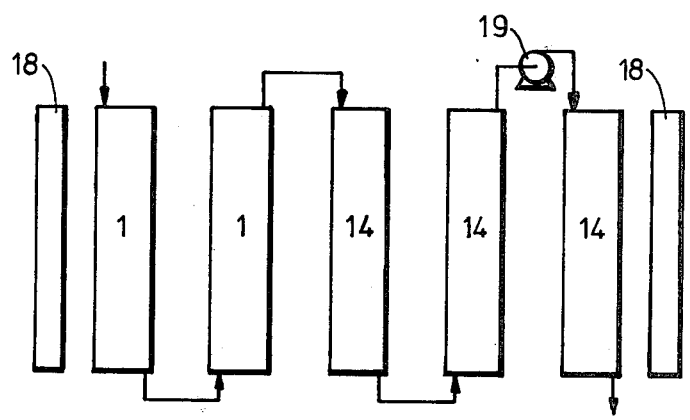
FIG. 5
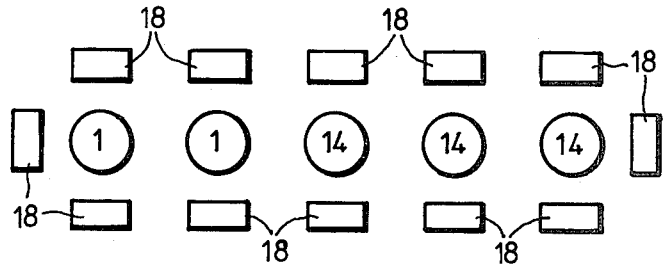
FIG. 6

USE OF AN APPARATUS FOR CONTINUOUS PHOTOPOLYMERIZATION

The invention relates to the use of an apparatus for the continuous photopolymerisation of ethylenically unsaturated monomers.

Initiation by light of the polymerisation of ethylenically unsaturated monomers is one of the oldest polymerisation processes and is often employed for examining polymerisation mechanisms. The industrial use of photopolymerisation has been concerned almost exclusively with photo-cross-linking systems such as photo-printing plates and light-hardening lacquer systems. Photopolymerisation has not been used hitherto in industry as a process for the production of linear homopolymers or copolymers, not least because hitherto hardly any technically suitable methods have been found for carrying out photopolymerisation on an industrial scale.

German Patent Specification No. 956,542, U.K. Pat. No. 817,343, German Offenlegungsscrift No. 2,009,748, and German Auslegesschrift No. 2,050,988 describe several types of apparatus for continuous photopolymerisation, in which a mass or solution of a monomer is charged on to a moving belt and is polymerised by irradiation when passing through a lamp channel thereon. This mode of operation has several great disadvantages. Firstly, it is necessary to maintain an oxygen-free atmosphere for vinyl polymerisation and this is difficult and only feasible with the use of expensive equipment. Furthermore, very thin layers are produced when the production line is charged with the low-viscosity monomers, and the absorption of the light for initiating polymerisation is therefore low and the volume yields per unit time are unsatisfactory.

Although this mode of operation might still produce useful results in the case of highly reactive vinyl monomers, such as for example acrylamide, it is unsuitable in the case of less reactive systems, particularly with styrene-containing mixtures, owing to the long residence times required.

These difficulties may be overcome by means of a method of operation described in German Auslegesschrift No. 2,115,706 in which a monomer mixture is enclosed in a plastic bag, placed in a scraping conveyor and conveyed through a lamp channel for polymerisation. The advantages of the absence of oxygen and the greater thickness of the layer obtainable are offset by the aggravating disadvantages of troublesome procedures needed for filling and emptying the plastic bags. This mode of operation cannot therefore be usefully employed industrially either.

A simple and economical apparatus for the continuous industrial photopolymerisation of ethylenically unsaturated monomers needs to be found, which allows the temperature and light control to be adapted in stages to a predetermined course.

According to the invention there is provided a process for continuous photopolymerisation of ethylenically unsaturated monomeric material wherein the material is passed through a plurality of successive reactors each of which is in the form of a glass cylinder having an inlet and an outlet, the material being subjected to constant thorough mixing in each reactor by a stirrer and heating or cooling by a heat exchanger, the stirrer and heat exchanger being located in the interior of the glass cylinder, the material also being subjected to irradiation with light initiating photopolymerisation from lamps around the exterior of the cylinder.

The invention preferably relates to an apparatus for carrying out mass photopolymerisation in accordance with German patent application P No. 2,600,318.9, characterised in that in the first stages of the reaction an internal coil is used for heating or cooling and a stirring shaft with stirring blades is used for stirring and mixing, whereas in the last stages of the reaction a central cylindrical internal body is used for heating and cooling and a coil, screw or a basket stirrer is used for stirring, mixing and conveying. In this case, the stirring mechanism is preferably rigidly fixed to the heating body. The reactors of the first type are generally used at the lower temperature while those of the second type are used at the elevated temperature.

The apparatus according to the invention allows photopolymerisation to be carried out at throughputs which may be theoretically high, with good volume yields per unit time. The thickness of the layer of irradiated monomers may be selected more or less as desired by suitable dimensioning of the reactor glass tube, so that optimum use of light may be obtained. Since the installation is of closed construction and is operated submerged, i.e. without gas chambers in the reactors, the considerable problem of excluding the oxygen is easily solved by flushing the entering reaction mixture with inert gas. The capital cost of the apparatus is relatively low, and it is inexpensive to maintain as it is simple to construct by a modular building method. Also, the apparatus allows polymerisation to cease very rapidly if necessary by switching off the light which initiates polymerisation.

Two embodiments of the invention are shown in the accompanying drawings, in which:

FIG. 3 shows a diagrammatic view of a two-stage reactor;

FIG. 4 shows a diagrammatic plan of the two-stage reactor of FIG. 3;

FIG. 5 shows a diagrammatic view of a two-stage reactor group; and

FIG. 6 shows a diagrammatic plan of the two-stage reactor group of FIG. 5.

Figure 1:
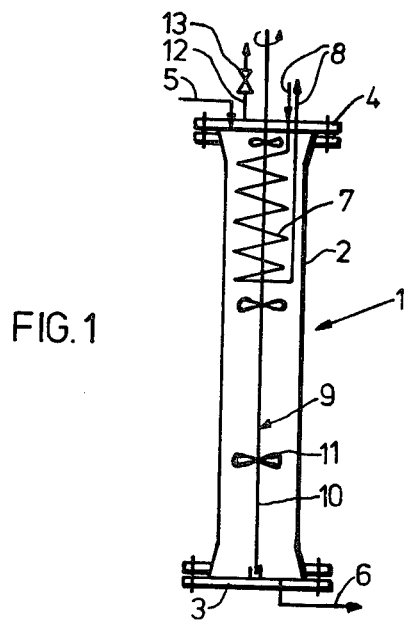
FIG. 1 shows a reactor with stirrer and coiled tubular heat exchanger.

FIG. 1 shows a reactor 1 for a low viscosity reactor medium. The reactor comprises an upright glass tube 2 sealed with covers 3 and 4 at both ends. The product feed and discharge pipes 5 and 6 are guided through the opposing covers 3 and 4. A heat exchanger 7 is connected via pipes 8 to an energy source (not shown). A stirrer 9 a shaft 10 and propellers 11 are mounted in the covers 3 and 4 and may be driven externally by a motor (not shown). A vent pipe 12 with a valve 13 is connected via the upper cover 4.

Figure 2:
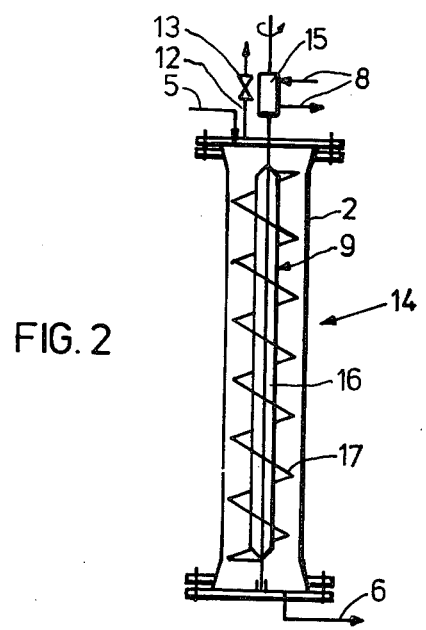
FIG. 2 shows a reactor with a coil and hollow shaft heat exchanger.

A reactor 14 for high viscosity reactor medium is shown in FIG. 2. The reactor 14 also comprises an upright glass tube 2 which is sealed with covers 3 and 4 at both ends. The product pipes 5 and 6 are connected through the opposing covers. A hollow shaft 16 replacing the heat exchanger 7, and axial with respect to the glass tube 2, is chargeable with heating medium from the exterior via a double inlet arrangement 15 and may be rotated by a motor (not shown). The shaft 16 is provided externally with a helically arranged plate 17. The vent pipe 12 with valve 13 communicates with the glass tube 2 via the upper cover 4.

FIGS. 3 to 6 show two or five reactors 1,14 which differ in construction and are combined with lamps 18, one or more reactors 1 of the first type are used for the first stage of the reaction and one or more reactors 14 of the second type are used for the final stage of polymerisation. A pump 19 is connected between the last two reactors 14 to overcome the increased viscosity.

In all cases, the light for initiating polymerisation is radiated from the outside through the glass tube 2 into the material on the reactor. Although it is possible in principle to use any sources of light which emit light of a suitable wavelength, superactinic fluorescent tubes with a maximum output at between 350 and 360 mm are preferably used. In the preferred embodiment of the invention, these fluorescent tubes are arranged in special closed lamp cases. When constructing these lamp cases, it is necessary to observe the regulations relating to the prevention of explosions, and they therefore have to be flushed with inert gas if necessary. These lamp cases are arranged round the individual reactors 1,14, and optionally also between the reactors 1,14.

The reaction mixture consisting of ethylenically unsaturated monomers, the photo-initiator and optionally other auxiliary agents such as, for example, molecular weight regulators and stabilisers, travels in the following manner. The mixture which is preferably under a pressure of between 1 and 5 m water column enters the first reactor at one end in a constant flow and after passing through the first reactor, emerges at the other end and then enters the second reactor in the same manner. The polymer conversion increases from reactor to reactor until the fully-reacted end product emerges at the end of the chain of reactors, generally as a viscose polymer melt. In this case, it is advantageous for the mixture to pass through the reactors in a rising and falling direction alternately so that particularly short connecting lines are produced between the reactors. As the viscosity of the mixture increases considerably during the reaction, in one embodiment of the invention a pump is installed between the reactors, preferably upstream of the last reactor, and this pump conveys the reaction mixture in a constant flow through the reactors. In another embodiment, the reactors of the final stage, (second type of reactor) are provided with a sufficient capacity for self-conveyance, thus avoiding the need for an intermediate delivery pump.

EXAMPLE

A mixture with the following composition:
1300 kg Styrene
700 kg Butyl acrylate
20 kg t-Dodecyl mercaptan
4 kg Benzoin isopropylether
is continuously photopolymerised in bulk in the apparatus described below. The mixture has an extinction of 100% at a wave-length of 350nm and a layer thickness of 6 mm.

Polymerisation is carried out in an installation composed of three reactors. The individual reactors are built of surface-ground glass tubes 225 mm in diameter and 1500 mm long. The first reactor corresponds in structure to FIG. 1 and the layer is 110 mm thick measured radially from the stirring shaft to the glass. The second and third reactors are identical in structure and correspond to FIG. 2. The heated central tube upon which the stirrer coil is fixed has a diameter of 48 mm so that the thickness of the layer from the central tube to the glass is 88 mm. The first reactor is operated at 90° C. and is stirred at 400 r.p.m.; the second reactor is operated at 130° C. and stirred at 8 r.p.m.; the third reactor is operated at 160° C. and stirred at 1 r.p.m. Thirty-two superactinic fluorescent tubes each of 40 W (maximum radiation 350 nm) in eight lamp cases are arranged round the reactors as sources of light.

The mixture passes in succession through the reactors which are operated submerged, the mixture descending through the first reactor, ascending through the second reactor, and descending through the third reactor. A polymer conversion (determined by baking for two hours at 200° C.) of 95.6% is obtained at a throughput of 30 kg per hour.

When the quantity of light is reduced by using sixteen fluorescent tubes, a polymer conversion of 94.3% is obtained under otherwise similar conditions at a throughput of 20 kg per hour.

In both cases, the product and the filling of the reactors is homogeneous and no caking of the polymer is observed.

What we claim is:

1. An apparatus for the continuous photopolymerisation of ethylenically unsaturated monomeric liquids, comprising at least one reactor, each reactor comprising an elongated vertically disposed glass cylinder having an inlet and an outlet at opposite ends thereof forming a straight liquid path therebetween, a heat exchanger located within the cylinder, along the straight liquid path, means for feeding liquid into the reactor under pressure, irradiating means disposed around the exterior of the cylinder adapted to irradiate the interior of the cylinder with light all along the straight liquid path from the inlet to the outlet to initiate photopolymerisation of material within the cylinder and stirring means disposed within the cylinder along the straight liquid path to continuously bring different molecules of the liquid into contact with the light during the travel thereof along the liquid path.

2. The apparatus according to claim 1, wherein the liquid is fed in at a reserve of from 1 to 5 m water column.

3. An apparatus according to claim 1, further comprising a plurality of reactors connected in series with one another.

4. The apparatus according to claim 3, wherein the liquid flow in successive reactors is alternatively from top to bottom and from bottom to top and the successive reactors are connected in series by alternatively connecting the bottoms and tops thereof.

5. The apparatus according to claim 3, wherein the irradiating means comprises lamps extending along the entire length of the glass cylinder.

* * * * *